(12) United States Patent
Nakatani

(10) Patent No.: US 10,677,912 B2
(45) Date of Patent: Jun. 9, 2020

(54) SIGNAL PROCESSING DEVICE, RADAR APPARATUS AND METHOD OF PROCESSING SIGNAL

(71) Applicant: FURUNO ELECTRIC CO., LTD., Nishinomiya, Hyogo (JP)

(72) Inventor: Fumiya Nakatani, Takarazuka (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 340 days.

(21) Appl. No.: 15/546,530

(22) PCT Filed: Dec. 15, 2015

(86) PCT No.: PCT/JP2015/085008
§ 371 (c)(1),
(2) Date: Jul. 26, 2017

(87) PCT Pub. No.: WO2016/125400
PCT Pub. Date: Aug. 11, 2016

(65) Prior Publication Data
US 2018/0284255 A1    Oct. 4, 2018

(30) Foreign Application Priority Data
Feb. 4, 2015    (JP) .................. 2015-020087

(51) Int. Cl.
*G01S 13/76*    (2006.01)
*G01S 13/28*    (2006.01)
(Continued)

(52) U.S. Cl.
CPC ............. *G01S 13/767* (2013.01); *G01S 7/12* (2013.01); *G01S 7/292* (2013.01); *G01S 13/28* (2013.01);
(Continued)

(58) Field of Classification Search
None
See application file for complete search history.

(56) References Cited

U.S. PATENT DOCUMENTS 5,953,159 A    9/1999  Shellans
6,396,434 B1   5/2002  Takase et al.
(Continued)

FOREIGN PATENT DOCUMENTS

CN       1209918 A     3/1999
CN     102749619 A    10/2012
(Continued)

OTHER PUBLICATIONS

The extended European search report and Communication pursuant to Rule 62 EPC issued by the European Patent Office dated Aug. 3, 2018, which corresponds to European Patent Application No. 15881217.2-1206 and is related to U.S. Appl. No. 15/546,530.
(Continued)

*Primary Examiner* — Whitney Moore
(74) *Attorney, Agent, or Firm* — Studebaker & Brackett PC

(57) ABSTRACT

A signal processing device and method to accurately detect a distress signal from a search and rescue transponder and reduce a calculation load for the detection. The device may include an instantaneous frequency change rate calculating module configured to calculate a change rate of an instantaneous frequency of a complex reception signal generated from a reception wave received by a wave receiver, a memory configured to store a value obtained based on a reference frequency sweeping speed that is a frequency sweeping speed of the distress signal, and a distress signal determining module configured to determine whether the distress signal is issued from the search and rescue transponder, based on a comparison result between the instantaneous frequency change rate calculated by the instanta-
(Continued)

neous frequency change rate calculating module and the value obtained based on the reference frequency sweeping speed stored in the memory.

15 Claims, 10 Drawing Sheets

(51) Int. Cl.
  *G01S 7/292* (2006.01)
  *G01S 7/12* (2006.01)
  *G01S 13/30* (2006.01)
  *G08G 3/00* (2006.01)

(52) U.S. Cl.
  CPC .............. *G01S 13/30* (2013.01); *G01S 13/76* (2013.01); *G08G 3/00* (2013.01)

(56) References Cited

U.S. PATENT DOCUMENTS

| | | |
|---|---|---|
| 2002/0163462 A1 | 11/2002 | Takase et al. |
| 2005/0200515 A1 | 9/2005 | Cherniakov |
| 2005/0270234 A1 | 12/2005 | Wolf et al. |
| 2006/0128354 A1* | 6/2006 | Carle .................... A62B 33/00 455/404.1 |
| 2009/0237290 A1 | 9/2009 | Kishinevsky |

FOREIGN PATENT DOCUMENTS

| | | |
|---|---|---|
| CN | 103675766 A | 3/2014 |
| EP | 2 821 808 A1 | 1/2015 |
| JP | 2001-141817 A | 5/2001 |
| JP | 2001-201569 A | 7/2001 |
| JP | 2002-328165 A | 11/2002 |
| WO | 2014-042134 A1 | 3/2014 |

OTHER PUBLICATIONS

International Search Report of the corresponding International Patent Application No. PCT/JP2015/085008, dated Mar. 15, 2016.

* cited by examiner

SIGNAL PROCESSING DEVICE, RADAR APPARATUS AND METHOD OF PROCESSING SIGNAL

CROSS REFERENCE TO RELATED APPLICATIONS

This application is a U.S. National stage of International Application No. PCT/JP2015/085008 filed on Dec. 15, 2015. This application claims priority to Japanese Patent Application No. 2015-020087 filed on Feb. 4, 2015. The entire disclosure of Japanese Patent Application No. 2015-020087 is hereby incorporated herein by reference.

TECHNICAL FIELD

This disclosure relates to a signal processing device, a radar apparatus, and a method of processing a signal.

BACKGROUND ART

Conventionally, ships and lifeboats are equipped with a Search And Rescue Transponder (SART). When the power of the SART is turned on in a distress situation, in response to receiving a radar wave in 9 GHz band from a ship or an aircraft, the SART transmits a distress (SOS) signal (SART distress signal) in the same 9 GHz band. This SART distress signal is a pulsed response signal formed by frequency sweep in a sawtooth form. Since a reception bandwidth of a ship radar is set so that the frequency sweep band of the distress signal traverses it, the radar apparatus can receive the distress signal as a pulse with a constant interval, and the SART distress signal is expressed in a radar image as a plurality of short points in a distance direction from the SART position.

As a radar apparatus which detects the SART distress signal as described above, for example, a radar apparatus disclosed in Patent Document 1 is known. In this radar apparatus, whether a SART distress signal is issued is determined by cross-correlating a signal at a constant cycle which is substantially the same as that of the SART distress signal with detection data detected by the radar apparatus.

REFERENCE DOCUMENT OF CONVENTIONAL ART

Patent Document

Patent Document 1: JP2001-141817A

DESCRIPTION OF THE DISCLOSURE

Problem to be Solved by the Disclosure

Incidentally, when detecting the SART distress signal with the radar apparatus described above, in a case where some of a plurality of (specifically, twelve) pulses constituting the SART distress signal are masked by other echo signals, the SART distress signal may not accurately be detected. Moreover, in the radar apparatus described above, the signal processing load becomes relatively high because the correlation calculation between waveform signals having a certain length (about the reception period of the SART distress signal) is required.

This disclosure is to solve the above problem and aims to accurately detect a distress signal from a search and rescue transponder and reduce a calculation load for the detection.

SUMMARY OF THE DISCLOSURE (1) In order to solve the problem described above, according to one aspect of the present disclosure, a signal processing device for detecting a distress signal from a search and rescue transponder may be provided. The device may include an instantaneous frequency change rate calculating module configured to calculate a change rate of an instantaneous frequency of a complex reception signal generated from a reception wave received by a wave receiver, a memory configured to store a value obtained based on a reference frequency sweeping speed that is a frequency sweeping speed of the distress signal, and a distress signal determining module configured to determine whether the distress signal is issued from the search and rescue transponder, based on a comparison result between the instantaneous frequency change rate calculated by the instantaneous frequency change rate calculating module and the value obtained based on the reference frequency sweeping speed stored in the memory.

(2) The signal processing device may further include an instantaneous frequency calculating module configured to calculate the instantaneous frequency by differentiating a phase of the complex reception signal with time. The instantaneous frequency change rate calculating module may calculate the instantaneous frequency change rate by differentiating the instantaneous frequency calculated by the instantaneous frequency calculating module with time.

(3) The memory may store a higher limit threshold that takes a higher value than the reference frequency sweeping speed and a lower limit threshold that takes a lower value than the reference frequency sweeping speed. The distress signal determining module may determine that the distress signal is included in the complex reception signal under a condition that the instantaneous frequency change rate is between the upper limit threshold and the lower limit threshold.

(4) The instantaneous frequency change rate calculating module may calculate the instantaneous frequency change rate at a plurality of timings. The distress signal determining module may determine that the distress signal is included in the complex reception signal under a condition that the instantaneous frequency change rate that is between the upper limit threshold and the lower limit threshold is continuously obtained for at least a given number of times.

(5) In order to solve the problem described above, according to one aspect of the present disclosure, a radar apparatus may be provided. The radar apparatus may include a wave receiver configured to receive a reception wave, any one of the signal processing devices described above, configured to detect the distress signal from the search and rescue transponder and generate a radar image of inside a detection area by processing the complex reception signal generated from the reception wave that is received by the wave receiver, and a display unit configured to display information regarding the distress signal detected by the signal processing device and the radar image.

(6) Regarding a first area that is at least a part of the detection area, the signal processing device may generate the radar image for a section of the first area where the distress signal is not detected by pulse-compressing the complex reception signal obtained from a reflection wave of a frequency-modulated pulse that is a transmission wave, and the signal processing device may generate the radar image for a section of the first area where the distress signal is detected by using the complex reception signal obtained from a reflection wave of a non-frequency-modulated pulse that is a transmission wave.

(7) In order to solve the problem described above, according to one aspect of the present disclosure, a method of processing a signal may be provided, which detects a distress signal from a search and rescue transponder. The method may include calculating a change rate of an instantaneous frequency of a complex reception signal generated from a reception wave received by a wave receiver, storing a value obtained based on a reference frequency sweeping speed that is a frequency sweeping speed of the distress signal, and determining whether the distress signal is issued from the search and rescue transponder, based on a comparison result between the instantaneous frequency change rate calculated by the calculating the instantaneous frequency change rate and the value obtained based on the reference frequency sweeping speed stored in the storing the value.

Effects of the Disclosure

According to the present disclosure, a distress signal from a search and rescue transponder may accurately be detected and a calculation load for the detection may be reduced.

MODE FOR CARRYING OUT THE DISCLOSURE

Hereinafter, a radar apparatus 1 according to one embodiment of the present disclosure is described with reference to the accompanying drawings. The present disclosure may widely be applied as a signal processing device, a radar apparatus, and a method of processing a reception signal generated from a reception wave.

The radar apparatus 1 may be comprised of a pulse compression radar apparatus which is one kind of a solid state radar apparatus. The radar apparatus 1 may detect a distress signal (SART distress signal) which is a response signal of a transponder (a search and rescue transponder (SART) in this embodiment), and generate a radar image.

Figure 1:
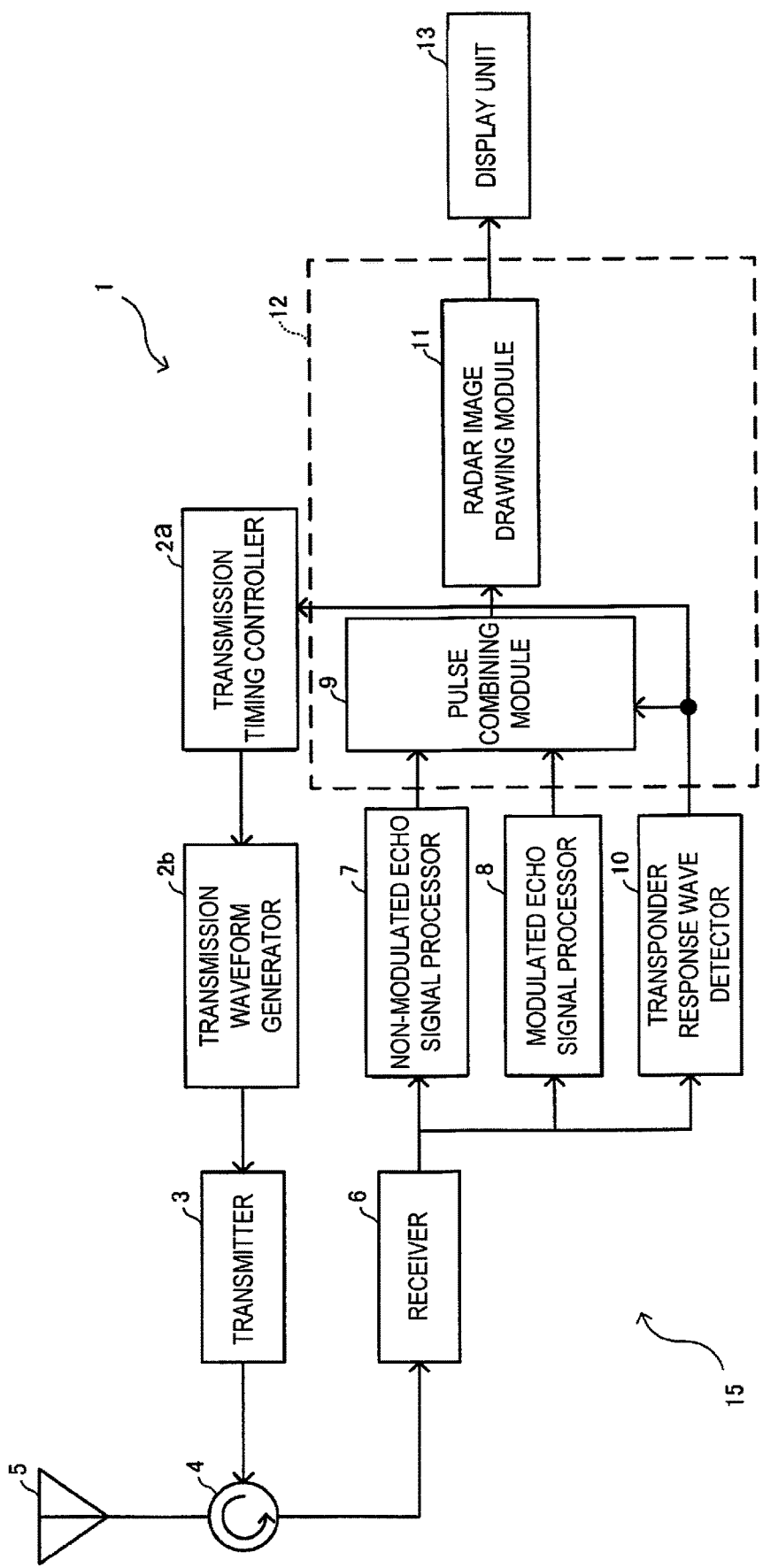
FIG. 1 is a block diagram of a radar apparatus according to one embodiment of the present disclosure.

FIG. 1 is a block diagram of the radar apparatus 1. The radar apparatus 1 may include a transmission timing controller 2a, a transmission waveform generator 2b, and a transmitter 3 as components of a transmission side system. The radar apparatus 1 may also include, as components of a reception side system, a receiver 6, a non-modulated echo signal processor 7, a modulated echo signal processor 8, a pulse combining module 9, and a transponder response wave detector 10. The radar apparatus 1 may further include a circulator 4, a radar antenna 5, a radar image drawing module 11, and a display unit 13. The transmission timing controller 2a, the transmission waveform generator 2b, the transmitter 3, the circulator 4, the receiver 6, the non-modulated echo signal processor 7, the modulated echo signal processor 8, the pulse combining module 9, the transponder response wave detector 10, and the radar image drawing module 11 described above may constitute a signal processing device 15.

The transmission timing controller 2a may output a transmission trigger which controls an output timing of a radar pulse from the transmission waveform generator 2b. The transmission timing controller 2a may control a transmission-and-reception period of a modulated pulse and a transmission-and-reception period of a non-modulated pulse by the transmission trigger. When a distress signal is detected during the transmission-and-reception period of the non-modulated pulse, the transmission-and-reception timing may be controlled so that the transmission-and-reception period of the non-modulated pulse is extended to an end point of a distressing signal detected area.

Figure 2:
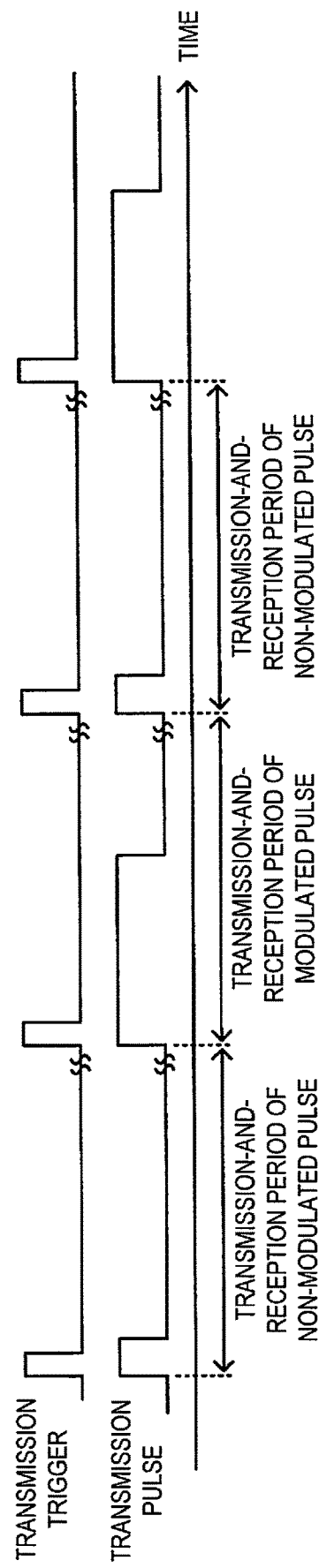
FIG. 2 is a view illustrating a transmission timing of the radar apparatus illustrated in FIG. 1.

The transmission waveform generator 2b may output the radar pulse based on the transmission trigger outputted from the transmission timing controller 2a. The pulse compression radar apparatus may be configured to transmit the non-modulated pulse which is not frequency-modulated, and the modulated pulse which is frequency-modulated, while switching therebetween as a radar pulse. The non-modulated pulse may be generated to have a short pulse width of, for example, about 0.1 μsec to 1 μsec, and the modulated pulse may be generated to have a long pulse width of, for example, about several μsec to several tens of μsec. As illustrated in FIG. 2, the transmission waveform generator 2b may alternately transmit the non-modulated pulse and the modulated pulse as a transmission pulse in a time division manner in synchronization with the transmission trigger.

The transmitter 3 may up-convert the radar pulse outputted from the transmission waveform generator 2b up to a given band, amplify the power thereof, and output it. The generated radar pulse may be supplied to the radar antenna 5 via the circulator 4. The radar antenna 5 may be a transmission-and-reception antenna (wave receiver) which is used for both the transmission and reception. The radar antenna 5 may rotate by having beam directivity.

The receiver 6 may be comprised of an amplifier which amplifies the reception signal, a mixer which down-converts a signal component of a desired frequency band included in the reception signal, various filters (LPF) which perform a quadrature detection of the down-converted signal component and output a complex signal (complex reception signal), an AD converter, etc. In a case where the SART receives the radar pulse (non-modulated pulse or modulated pulse) emitted from the radar antenna 5 and transmits a response signal (distress signal), the distress signal may be included in the reception signal inputted to the receiver 6.

The non-modulated echo signal processor 7 may be comprised of a filter (e.g., LPF or BPF) having a passband of a frequency width corresponding to approximately a reciprocal of the pulse width of the non-modulated pulse signal. The non-modulated echo signal processor 7 may fetch the reception signal in the transmission-and-reception period of the non-modulated pulse and perform reception processing on a reception echo to extract reception echo data of a short distance area (second area).

The modulated echo signal processor 8 may be configured to include a matched filter in which a coefficient having high correlation with the modulated pulse signal which serves as a frequency-modulated transmission pulse is set. The modulated echo signal processor 8 may fetch the reception signal during the transmission-and-reception period of the modulated pulse, pulse-compress a reception echo, and extract the reception echo data of a long distance area which is a first area. Since the reception echo which is subjected to the pulse compression may be a reflection wave of the modulated pulse signal, to the matched filter may be used to indicate a peak of the reception echo of the modulated pulse signal. That is, the reception echo having a long pulse width corresponding to the pulse width of the modulated pulse signal may be converted into a single pulse-compressed peak waveform. The pulse-compressed peak waveform may show a peak level corresponding to the pulse width of the modulated pulse signal. Since the pulse width of the modulated pulse signal is longer than that of the non-modulated pulse, an S/N ratio may be improved.

The pulse combining module 9 may combine the reception echo of the non-modulated pulse outputted from the non-modulated echo signal processor 7, with the reception echo of the modulated pulse outputted from the modulated echo signal processor 8. The reception echo of the non-modulated pulse outputted from the non-modulated echo signal processor 7 may indicate a reception echo in a short distance and the reception echo of the modulated pulse outputted from the modulated echo signal processor 8 may indicate a reception echo in a long distance. Therefore, by combining these two reception echoes, a wide range of reception echoes from a short distance to a long distance may be obtained. A dead zone in the short distance during the transmission-and-reception period of the modulated pulse may be compensated by an image of the reception echo of the non-modulated pulse. The radar image drawing module 11 may transfer the reception signal (radar echo) in an Rθ coordinate system outputted from the pulse combining module 9 to the display unit 13 while converting it into an XY coordinate system. The pulse combining module 9 and the radar image drawing module 11 may constitute the radar image generator 12 which generates the radar image. The radar image generator 12 may generate the radar image by combining the reception echo data of the short distance and the reception echo data of the long distance. Based on a detection result of the transponder response wave detector 10, the radar image may be configured without using the pulse-compressed reception signal in a transponder response wave detected area. The display unit 13 may display the radar image inputted from an radar image generator 12.

Here, the reception echo obtained by transmitting the non-modulated pulse and the modulated pulse in the time division manner is described. Usually, the ship radar may perform the transmission and reception by the radar antenna 5. Therefore, the transmission wave may directly loop into the receiver 6 during the transmission period. The looped-in radio wave may be extremely strong with respect to the reception echo, the reception echo may be masked. Thus, a distance range corresponding to the pulse width of the transmission pulse may become the dead zone. In the pulse compression radar, a modulated pulse having a relatively long pulse width may be transmitted so as to improve the S/N ratio after the pulse compression. As a result, the dead zone may also become wide. For example, if the pulse width of the modulated pulse is 10 μsec, the range of about 1,500 m from the ship radar may become the dead zone.

Figure 3:
FIG. 3 is a radar image configuration view of the radar apparatus illustrated in FIG. 1.

Therefore, the pulse compression radar may be configured so that the dead zone for the radar detection by the modulated pulse is compensated with the transmission and reception of the non-modulated pulse. That is, the transmission and reception of the modulated pulse which is pulse-compressed when the echo is received, and the transmission and reception of the non-modulated pulse which is not pulse compressed may be performed in a time division manner. Then the echoes may be combined to generate the radar image. FIG. 3 is a schematic view of the radar image formed by combining the reception echoes obtained by transmitting the non-modulated pulse and the modulated pulse in the time division manner. The cross mark at the center of the drawing may be a position of the pulse compression radar apparatus. The short distance range centering on the position of the pulse compression radar apparatus (second area) may be an image display area based on the reception echo detected at the time of the transmission and reception of the non-modulated pulse. The long distance range formed outside the short distance range (first area) may be an image display area based on the reception echo detected at the time of the transmission and reception of the modulated pulse. Note that, a pulse compression gain (S/N improvement) cannot be obtained during the transmission-and-reception period of the non-modulated pulse. However, this may not practically be a problem by limiting an applicable distance range of the non-modulated pulse to the vicinity of the ship as much as possible (to about the pulse width of the modulated pulse).

In the pulse compression radar, the transponder response wave detector 10 may have a function of detecting the SART distress signal from among the reception signals. The operations of the transmission timing controller 2a and the pulse combining module 9 may be controlled according to the detection result of the transponder response wave detector 10.

In this embodiment, the SART may be assumed to be a transponder. The transponder response wave in this case may be the SART distress signal. The SART distress signal may be a pulse which is frequency-swept in a sawtooth form and be defined as shown in Table 1.

TABLE 1

| Specification Item | Specified Value |
| --- | --- |
| Frequency | 9,200-9,500 MHz |
| Sweep rate | 5 μs per 200 MHz, nominal |
| Response signal | 12 sweeps |
| Form of sweep (sawtooth) | Forward sweep time: 7.5 μs ± 1 μs; Return sweep time: 0.4 μs ± 0.1 μs The response shall commence with a return sweep. |
| Pulse emission | 100 μs nominal |

Figure 4:
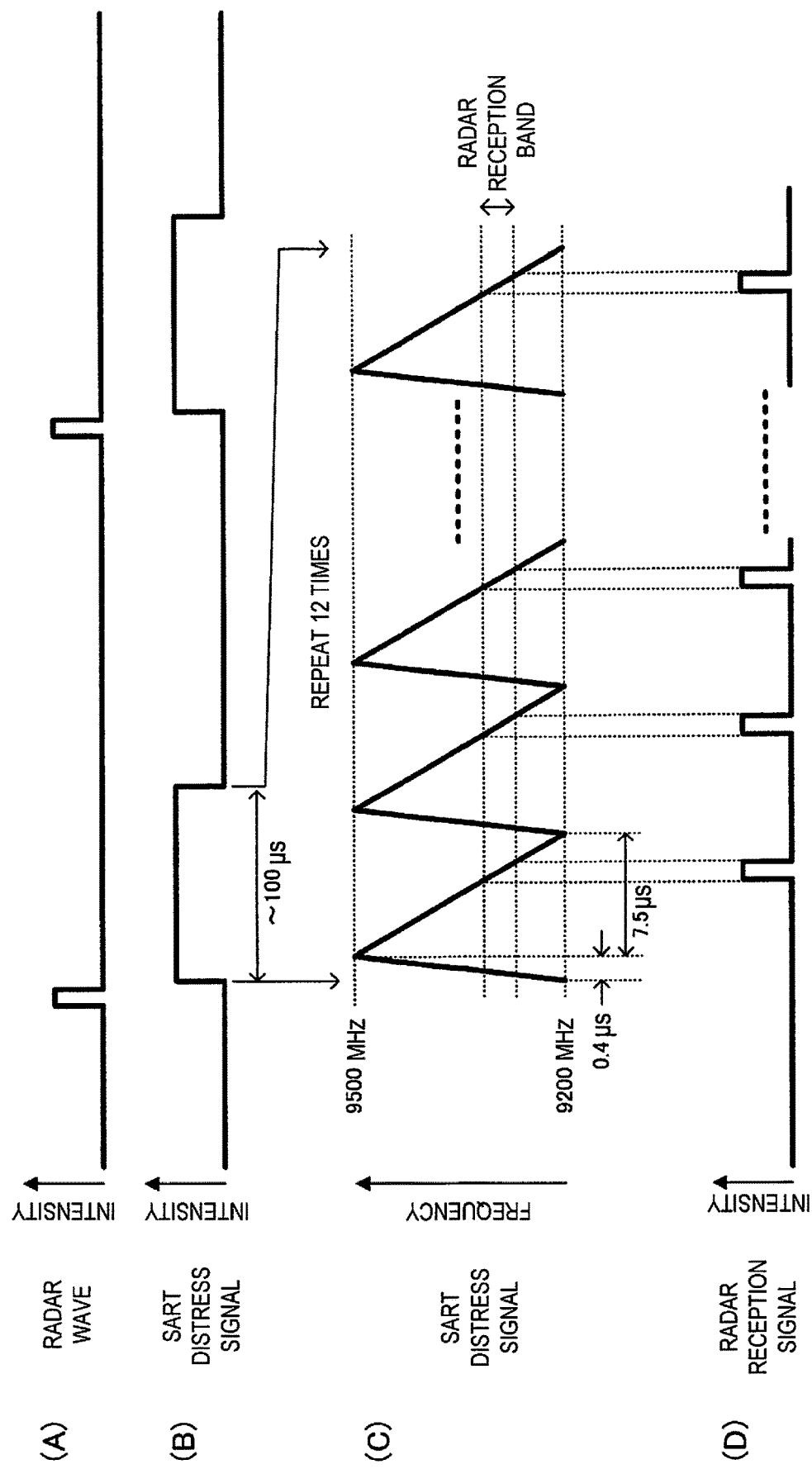
FIG. 4 shows views illustrating timings for a SART distress signal and a radar reception signal.
Figure 5:
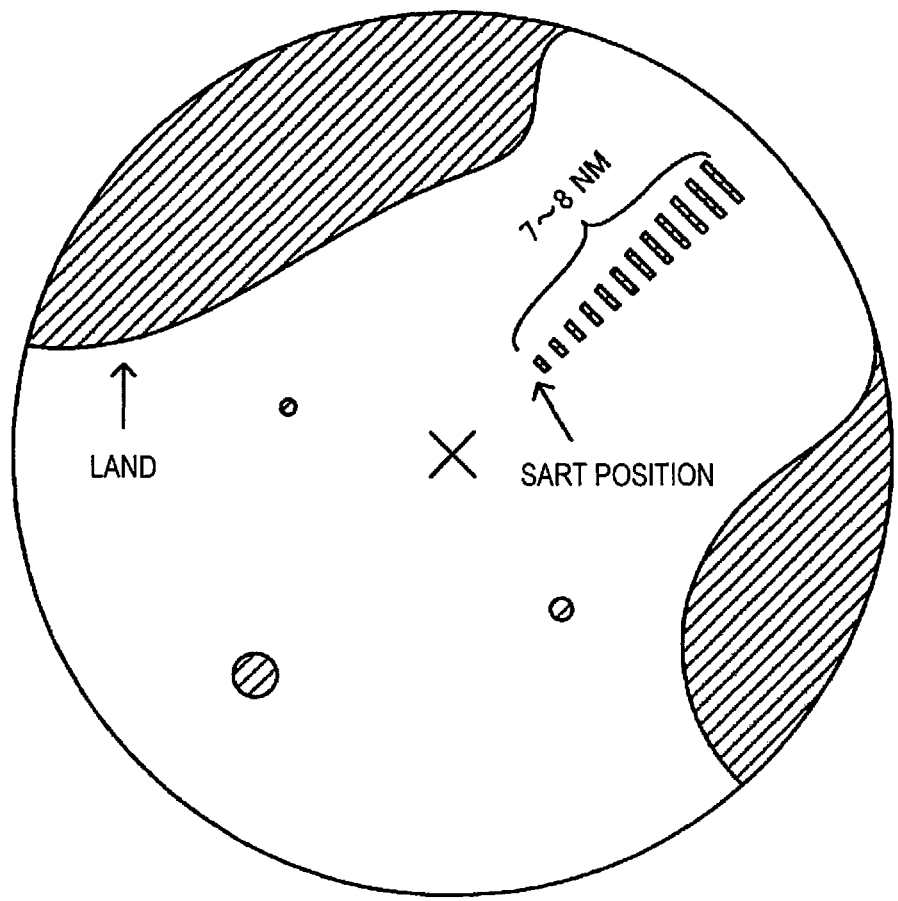
FIG. 5 is a radar image configuration view of the SART distress signal.

FIG. 4 illustrates a schematic timing chart from when the SART receives the radar wave and the SART distress signal is transmitted, until the radar reception signal is obtained by the radar apparatus. When the SART receives the radar wave (Part (A) of FIG. 4), it may transmit the SART distress signal in a transmission period of 100 μsec (Part (B) of FIG. 4). The frequency sweep band of the SART distress signal may be 9,200 to 9,500 MHz, and in one transmission, twelve pulses of which frequencies are swept in the sawtooth form may continuously be transmitted (Part (C) of FIG. 4). The reception bandwidth of a general ship radar may be, for example, about 1 to 40 MHz with the center frequency being 9,400 MHz. Therefore, when the SART distress signal traverses the radar reception band in a down frequency sweeping process, the radar apparatus may receive the SART distress signal as a pulse (Part (D) of FIG. 4). Although the radar apparatus may receive the SART distress signal also in an up frequency sweeping process when the SART distress signal traverses the radar reception band, since the up frequency sweep may have a steep slope compared with the down frequency sweep as illustrated in Part (C) of FIG. 4, it may not be detected as a pulse or have an extremely low signal level. In Part (D) of FIG. 4, the SART distress signal received during the down frequency sweeping process of the SART distress signal may be illustrated as the radar reception signal. As illustrated in FIG. 5, the radar image displayed on the display unit 13 may be expressed as twelve short points in a distance direction from the SART position. A radar operator can immediately know existence of a ship in distress from this characteristic pattern and report to a particular management station for rescue.

[Configuration of Transponder Response Wave Detector]

The transponder response wave detector 10 may detect the SART distress signal from among the reception signals. An example of a specific configuration of the transponder response wave detector 10 is described below.

Figure 6:
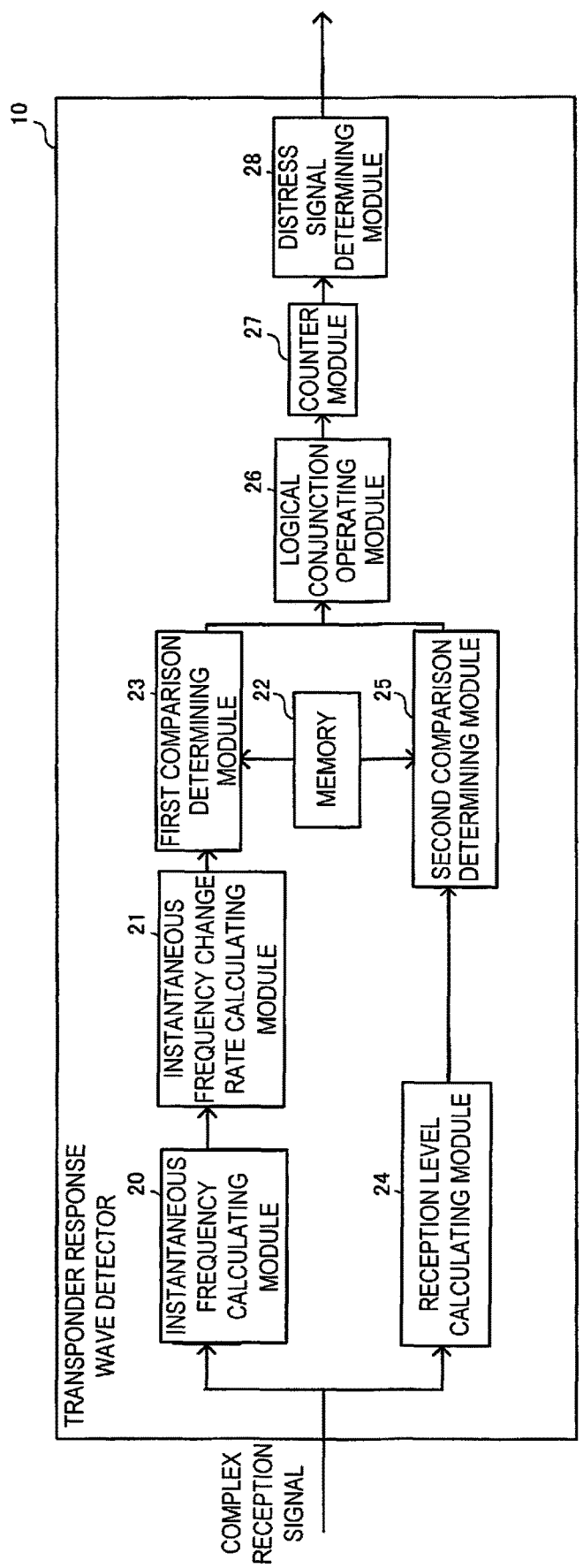
FIG. 6 is a block diagram of a transponder response wave detector illustrated in FIG. 1.

FIG. 6 is a diagram illustrating functional blocks of the transponder response wave detector 10. The transponder response wave detector 10 may include an instantaneous frequency calculating module 20, an instantaneous frequency change rate calculating module 21, a memory 22, a first comparison determining module 23, a reception level calculating module 24, a second comparison determining module 25, a logical conjunction operating module 26, a counter module 27, and a distress signal determining module 28.

The instantaneous frequency calculating module 20 may calculate an instantaneous frequency f(t) of the complex reception signal outputted from the receiver 6. For example, the instantaneous frequency calculating module 20 may calculate the instantaneous frequency f(t) by differentiating the phase of the complex reception signal with time. The instantaneous frequency calculating module 20 may calculate the instantaneous frequency f(t) at respective timings at a constant interval, and sequentially output the calculated instantaneous frequency f(t) at each timing to the instantaneous frequency change rate calculating module 21.

The instantaneous frequency change rate calculating module 21 may calculate a change rate of the instantaneous frequency f(t) (instantaneous frequency change rate $\Delta f(t)$) based on the instantaneous frequency f(t) calculated by the instantaneous frequency calculating module 20. For example, the instantaneous frequency change rate calculating module 21 may calculate the instantaneous frequency change rate $\Delta f(t)$ by differentiating the instantaneous frequency f(t) with time. The instantaneous frequency change rate calculating module 21 may sequentially calculate the instantaneous frequency change rate $\Delta f(t)$ for each instantaneous frequency f(t) outputted from the instantaneous frequency calculating module 20, and sequentially output it to the first comparison determining module 23.

The memory 22 may store an upper limit threshold $Th_{HiGH}$, a lower limit threshold $Th_{LOW}$, and a first threshold Th1. The upper limit threshold $Th_{HiGH}$ may be set to a slightly higher value than a frequency sweeping speed of the SART distress signal (reference frequency sweeping speed) determined by a standard. On the other hand, the lower limit threshold $Th_{LOW}$ may be set to a slightly lower value than the reference frequency sweeping speed described above. The first threshold Th1 may be set to be a value corresponding to the signal intensity of the SART distress signal. Particularly, the value of the first threshold Th1 may preferably be lower than the signal intensity of the SART distress signal and higher than signal intensities of noise and small echoes. Further, since the signal intensity of the SART distress signal may attenuate as the distance between the position of the ship and the SART increases, the first threshold Th1 may preferably take a value in a curve so that it gradually attenuates from a short distance to a long distance. The first threshold Th1 may be used to exclude the noise and small echoes from the target of detection.

The first comparison determining module 23 may output 1 or 0 as a flag 1 to the logical conjunction operating module 26 according to the value of the instantaneous frequency change rate $\Delta f(t)$ sequentially outputted from the instantaneous frequency change rate calculating module 21. For example, when the instantaneous frequency change rate $\Delta f(t)$ is between the lower limit threshold $Th_{LOW}$ and the upper limit threshold $Th_{HiGH}$, the first comparison determining module 23 may output 1 as the flag 1 to the logical conjunction operating module 26. On the other hand, when the instantaneous frequency change rate $\Delta f(t)$ is below the lower limit threshold $Th_{LOW}$ or above the upper limit threshold $Th_{HiGH}$, the first comparison determining module 23 may output 0 as the flag 1 to the logical conjunction operating module 26. That is, the first comparison determining module 23 may output 1 if the instantaneous frequency change rate $\Delta f(t)$ from the instantaneous frequency change rate calculating module 21 is approximately the same as the frequency sweeping speed of the SART distress signal. On the other hand, the first comparison determining module 23 may output 0 if the instantaneous frequency change rate $\Delta f(t)$ is greatly different from the frequency sweeping speed of the SART distress signal.

The reception level calculating module 24 may calculate a level of the complex reception signal outputted from the receiver 6 (reception signal level L(t)). The reception level calculating module 24 may calculate the reception signal level L(t) of the complex reception signal at each timing of sequential output from the receiver 6.

The second comparison determining module 25 may output 1 or 0 as a flag 2 to the logical conjunction operating module 26 according to the value of the reception signal level L(t) sequentially outputted from the reception level calculating module 24. For example, when the value of the reception signal level L(t) is above the first threshold Th1, the second comparison determining module 25 may output 1 as the flag 2 to the logical conjunction operating module 26. On the other hand, when the value of the reception signal level L(t) is below the first threshold Th1, the second comparison determining module 25 may output 0 as the flag 2 to the logical conjunction operating module 26. That is, the second comparison determining module 25 may output 1 if the value of the reception signal level L(t) is relatively high and a possibility that the reception signal is the SART distress signal is high. On the other hand, the second comparison determining module 25 may output 0 if the value of the reception signal level L(t) is relatively low and the possibility that the reception signal is the SART distress signal is low.

The logical conjunction operating module 26 may calculate a logical conjunction of the value (0 or 1) of the flag 1 outputted from the first comparison determining module 23 and the value (0 or 1) of the flag 2 outputted from the second comparison determining module 25, and output the calculation result as a flag 3 to the counter module 27. In other words, when the value of the flag 1 is 1 and the value of the flag 2 relating to the flag 1 is 1, the logical conjunction operating module 26 may output 1 as the flag 3 to the counter module 27, and in other cases, output 0 as the flag 3 to the counter module 27. That is, when certain sample data highly possibly indicates the SART distress signal based on the instantaneous frequency change rate Δf(t) and the value of the reception signal level L(t), the logical conjunction operating module 26 may output 1 as the flag 3, and otherwise, it may output 0 as the flag 3. The logical conjunction operating module 26 may output to the counter module 27 the value of the flag 1 which is sequentially outputted from the first comparison determining module 23, and the value of the flag 2 which is sequentially outputted from the second comparison determining module 25 and relating to the flag 1.

When the value of the flag 3 outputted from the logical conjunction operating module 26 is 1, the counter module 27 may increment 1 to the count value stored in the counter module 27. On the other hand, when the value of the flag 3 outputted from the logical conjunction operating module 26 is 0, the counter module 27 may reset the count value stored in the counter module 27 to 0. That is, the count value stored in the counter module 27 may be the number which results from the value as the flag 3 outputted from the logical conjunction operating module 26 continuously being 1 and is stored in a case where the value as the flag 3 continuously remains 1 by that time point.

When the counter value stored in the counter module 27 exceeds a given threshold (second threshold Th2), the distress signal determining module 28 may determine that the complex reception signal includes the SART distress signal.

Further, when the SART distress signal is detected as described above, the transmission timing controller 2a and the pulse combining module 9 may perform the transmission timing control and the pulse combining so that the reception signal of the modulated pulse is not reflected on the radar image during the reception period determined to be of the SART distress signal.

[Operation of Radar Apparatus]

Next, the operation of the radar apparatus 1 of this embodiment configured as described above is described in detail. In the following, the detection operation of the SART distress signal in the transponder response wave detector 10 is first described with reference to FIG. 7. Then, the operations for the case where the SART distress signal is detected during the transmission-and-reception period of the non-modulated pulse, and the case where the SART distress signal is detected during the transmission-and-reception period of the modulated pulse are described.

Figure 7:
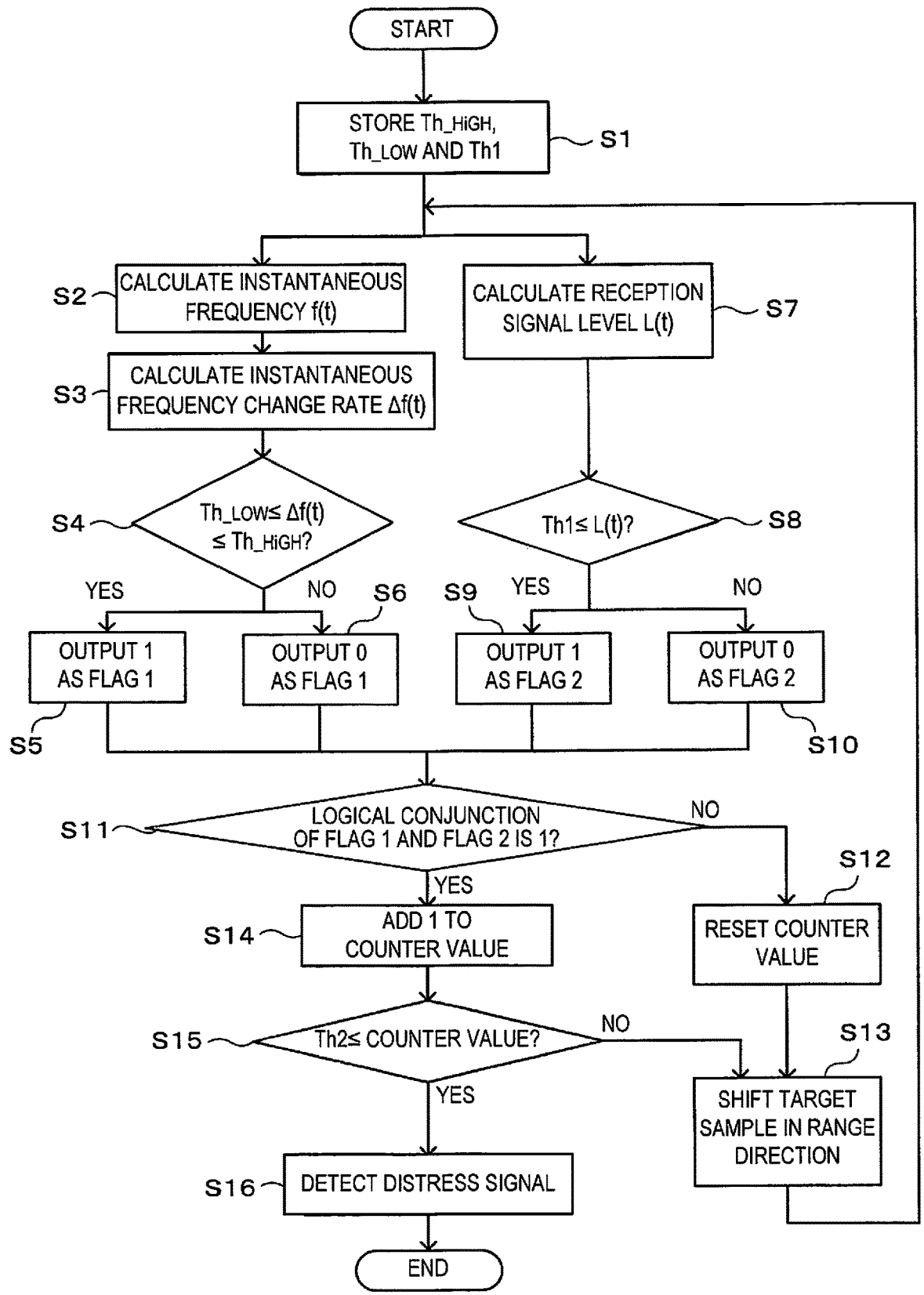
FIG. 7 is a flowchart illustrating operation of the transponder response wave detector illustrated in FIG. 6.

FIG. 7 is a flowchart illustrating the operation of the transponder response wave detector 10. Note that, before the operation of the transponder response wave detector 10 is started, the upper limit threshold $Th_{\_HiGH}$, the lower limit threshold $Th_{\_LOW}$, and the first threshold Th1 may be stored in the memory 22, for example, at the time of manufacturing the radar apparatus 1 (S1).

Next, at S2, the instantaneous frequency calculating module 20 may use a sample of a given position in a range direction as a target sample, calculate the instantaneous frequency f(t) of the complex reception signal of the target sample. For example, at S2, the instantaneous frequency f(t) of the complex reception signal may be calculated by obtaining a time derivative of the phase of the complex reception signal.

Next, at S3, the instantaneous frequency change rate calculating module 21 may calculate the change rate of the instantaneous frequency f(t) calculated at S2 (instantaneous frequency change rate Δf(t)). For example, at S3, the instantaneous frequency change rate Δf(t) may be calculated by obtaining a time derivative of the instantaneous frequency f(t).

Next, at S4, the first comparison determining module 23 may determine whether the instantaneous frequency change rate Δf (t) is between the lower limit threshold $Th_{\_LOW}$ and the upper limit threshold $Th_{\_HiGH}$. If the instantaneous frequency change rate Δf(t) is between the lower limit threshold $Th_{\_LOW}$ and the upper limit threshold $Th_{\_HiGH}$ (S4: YES), the first comparison determining module 23 may output 1 as the flag 1 to the logical conjunction operating module 26 (S5). On the other hand, if the instantaneous frequency change rate Δf(t) is below the lower limit threshold $Th_{\_LOW}$ or above the upper limit threshold $Th_{\_HiGH}$ (S4: NO), the first comparison determining module 23 may output 0 as the flag 1 to the logical conjunction operating module 26 (S6).

Meanwhile, the flow from S7 to S10 described in detail below may be performed in parallel with, before, or after S2 to S6 described above.

At S7, the reception level calculating module 24 may use a sample of a given position in the range direction (the same sample as the target sample at S2 described above) as a target sample and may calculate the reception signal level L(t) of the complex reception signal of the target sample.

Next, at S8, the second comparison determining module 25 may determine whether the reception signal level L(t) is above the first threshold Th1. If the reception signal level L(t) is above the first threshold Th1 (S8: YES), the second comparison determining module 25 may output 1 as the flag 2 to the logical conjunction operating module 26 (S9). On the other hand, if the reception signal level L(t) is below the first threshold Th1 (S8: NO), the second comparison determining module 25 may output 0 as the flag 2 to the logical conjunction operating module 26 (S10).

Next, at S11, the logical conjunction operating module 26 may calculate the logical conjunction of the flag 1 and the flag 2. If the logical conjunction of the flag 1 and the flag 2 is 1 (S11: YES), the flow may proceed to S14. On the other hand, if the logical conjunction of the flag 1 and the flag 2 is 0 (S11: NO), the flow may proceed to S12.

When the logical conjunction of the flag 1 and the flag 2 is 0 at S11, the counter value stored in counter module 27 may be reset to 0 at S12.

Next, at S13, the target sample for which the instantaneous frequency f(t) and the reception signal level L(t) are to be calculated may be shifted in the range direction (specifically, to the side farther from the ship in the range direction). Then, the flow may return to S2 and S7 so that the instantaneous frequency f(t) and the reception signal level L(t) are calculated for the complex reception signal of the newly set target sample.

On the other hand, when the logical conjunction of the flag 1 and the flag 2 is 1 at S11, 1 is added to the counter value stored in counter module 27 at S14.

Next, at S15, the distress signal determining module 28 may determine whether the distress signal is issued. For example, at S15, when the counter value stored in the counter module 27 is below the second threshold Th2 (S15: NO), the distress signal determining module 28 may detect no distress signal. Then, after the target sample is shifted in the range direction at S13, the instantaneous frequency f(t) and the reception signal level L(t) may be calculated for the complex reception signal of the newly set target sample (S2 and S7). On the other hand, if the counter value is above the second threshold Th2 (S15: YES), the distress signal determining module 28 may detect the distress signal considering that the complex reception signal includes the distress signal (S16).

Next, the operation when the SART distress signal is detected during the transmission-and-reception period of the non-modulated pulse is described. As described above, the distress signal determining module 28 may detect the SART distress signal. Since there is a high possibility that the SART distress signal is continuously received for a given period of time (e.g., 100 µs) from the time point at which the signal is first detected, in the meantime, the transmission-and-reception period of the non-modulated pulse may be maintained without shifting to the transmission-and-reception period of the modulated pulse. That is, the next transmission trigger may be delayed so that the transmission-and-reception period of the non-modulated pulse is extended until the end of the detected area of the SART distress signal. The pulse combining module 9 may generate the combined signal by using the reception signal of the non-modulated pulse until the end point of the SART distress signal, and using the reception signal of the modulated pulse thereafter.

Figure 8:
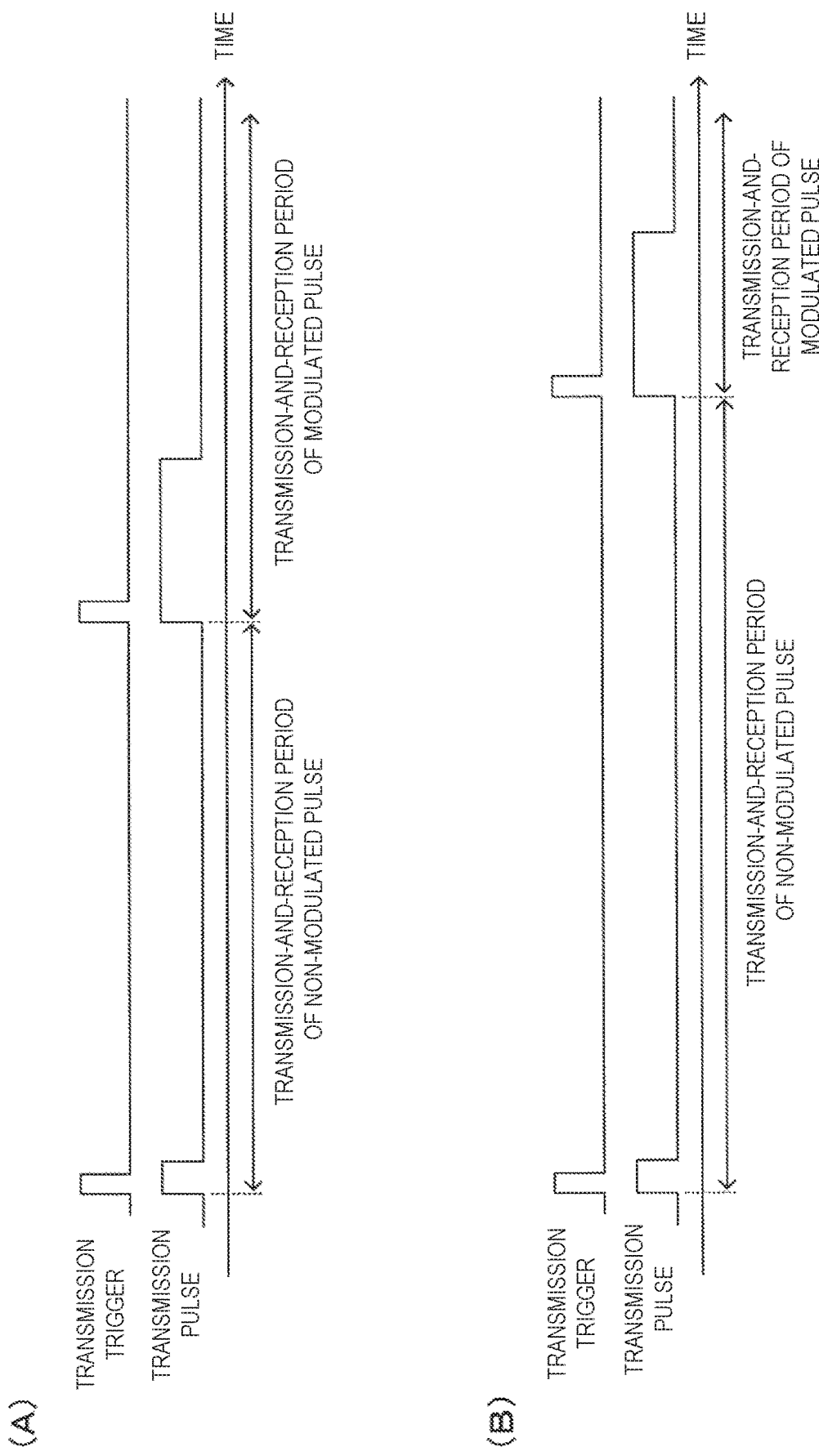
FIG. 8 shows views illustrating extending operation of a transmission-and-reception period of a non-modulated pulse.

FIG. 8 illustrates each of a case where the SART distress signal is not detected in the transmission-and-reception period of the non-modulated pulse (Part (A) of FIG. 8) and a case where the SART distress signal is detected in the transmission-and-reception period of the non-modulated pulse. When the SART distress signal is detected during the transmission-and-reception period of the non-modulated pulse, the transmission and reception may not shift to the transmission-and-reception period of the modulated pulse until the end of the detected area of the SART distress signal.

Figure 9:
FIG. 9 is a radar image configuration view in the case where the transmission-and-reception period of the non-modulated pulse is extended.

FIG. 9 illustrates an example of a radar image configuration view drawn in the case where the SART distress signal is detected in the transmission-and-reception period of the non-modulated pulse. When the SART distress signal is detected during the transmission-and-reception period of the non-modulated pulse, since the transmission-and-reception period of the non-modulated pulse is maintained during the reception period of the SART distress signal, the radar image may be drawn based on the output signal of the non-modulated echo signal processor 7 which is not pulse-compressed (SART distress signal). As a result, even in the image display area using the modulated pulse, the transmission-and-reception period of the non-modulated pulse may be extended to the end point of the detected area of the SART distress signal, and for the area where the SART distress signal is detected, the radar image may be drawn using the echo of the non-modulated pulse.

Since the radar antenna 5 may rotate by having beam directivity, in the display area where the SART position deviates from the emission range of the transmission pulse, the SART distress signal may not be detected. Then, when the SART distress signal is no longer detected, the transmission-and-reception periods of the non-modulated and modulated pulses may be reset back to the initial state. As a result, as illustrated in FIG. 9, at an azimuth at which the SART distress signal is no longer detected, the radar image using the echo of the modulated pulse may be drawn outside the image display area using the echo of the non-modulated pulse.

Figure 10:
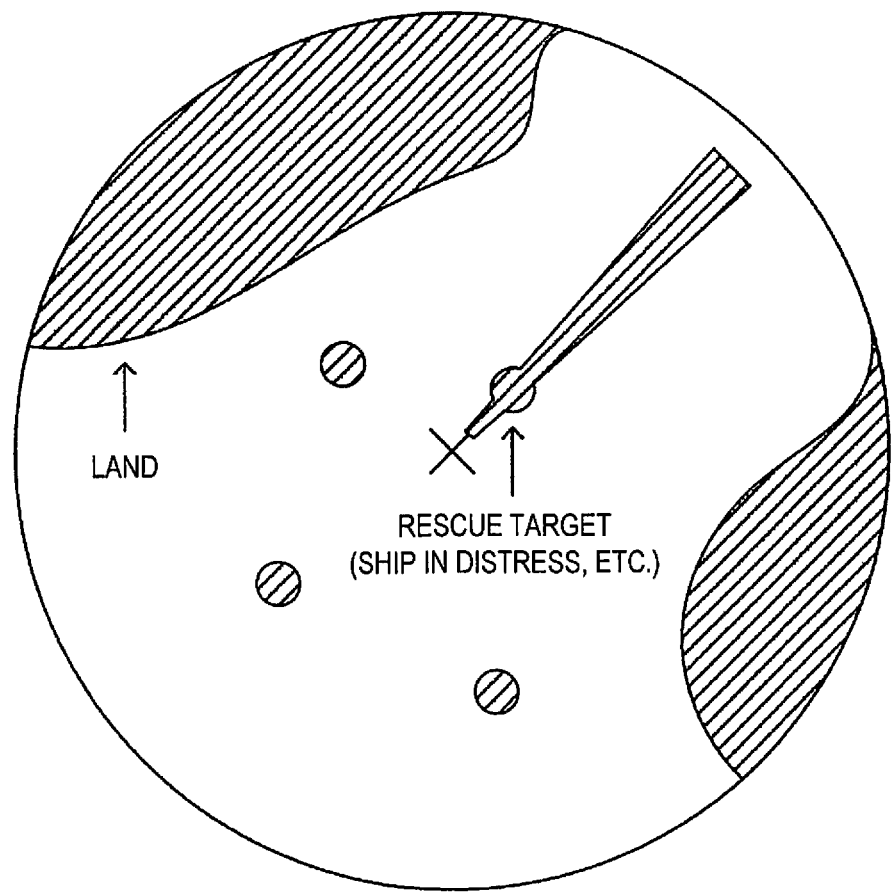
FIG. 10 is a view illustrating a display example of an image of a pulse-compressed SART distress signal.

FIG. 10 illustrates a display example of an image of the pulse-compressed SART distress signal. As illustrated in the drawing, the twelve short point pattern may extend in the distance direction because of the pulse compression, and the short points may completely be connected to each other. Since it is no longer the twelve short points, the radar operator cannot recognize that it is a SART distress signal. Further, although it may be recognized that a ship in distress is located near the start point of the twelve short points based on the original image of the SART distress signal, if the SART distress signal is pulse-compressed, the short points may also extend to the shorter distance side. Therefore, the distance to the ship in distress may become uncertain. Furthermore, in a case where a target object is located on the SART distress signal, the existence of the target object may be recognized by displaying the echo in the gap between the short points. However, if the gap is filled by the pulse compression, the echo may completely be masked by the distress signal.

In this embodiment, when the SART distress signal is detected, the radar image may be generated without using the reception signal of the modulated pulse accompanied by the pulse compression, for the area (azimuth and distance range) where the SART distress signal is detected. As illustrated in FIG. 9, the SART distress signal may be displayed as the twelve short point pattern, and the inconvenience that the echo is completely masked by the distress signal may also be avoided.

Next, the operation when the SART distress signal is detected during the transmission-and-reception period of the modulated pulse is described.

When the distress signal determining module 28 detects the SART distress signal, it may combine pulses without using the pulse compressed data corresponding to the reception period of the determined SART distress signal (the output of the modulated echo signal processor 8). The image data of the reception period determined as the reception period of the SART distress signal here may be substituted with, for example, the pulse-compressed data obtained in the previous transmission-and-reception period (the transmission-and-reception period in which the SART distress signal is not detected).

Also in the subsequent transmission-and-reception cycle, there may be a high possibility that the SART distress signal is detected over a similar distance range. If the substitution remains to be performed with the data before the SART distress signal is detected as described above, the echo which is truly located at the azimuth concerned cannot be grasped. Therefore, when the SART distress signal is detected during the transmission-and-reception period of the modulated pulse, the transmission-and-reception timing control may be performed so that the subsequent transmission-and-reception period of the non-modulated pulse is extended to the end point of the reception period of the determined SART distress signal. In this manner, the radar image may be drawn using the non-modulated pulse echo in the area where the SART distress signal is detected.

Since the radar antenna 5 rotates by having beam directivity, in either of the above cases, the SART distress signal may eventually be out of the range. When the SART distress signal is no longer detected, the transmission-and-reception periods of the non-modulated and modulated pulses may be reset back to the initial state.

As described above, the pulse compression radar apparatus of this embodiment may detect the SART distress signal from the reception signal, and when the SART distress signal is detected, for the area (azimuth and distance range) where the SART distress signal is detected, the radar image may be generated without using the reception signal of the modulated pulse accompanied by the pulse compression. Thus, in the conventional arts, when the SART distress signal is pulse-compressed and displayed on the radar image, the problem that the radar operator cannot normally recognize the twelve short points which are the feature of the SART distress signal may be solved. Moreover, other problems caused by the SART distress signal extending in the distance direction because of the pulse compression, such as the distance to the SART cannot accurately be grasped or other echoes are masked, may be solved.

Note that, in this embodiment, the configuration is applied, in which when the SART distress signal is detected, for the area (azimuth and distance range) where the SART distress signal is detected, the radar image may be generated without using the reception signal of the modulated pulse accompanied by the pulse compression. However, the following modifications may also be possible.

That is, a configuration may be applied, in which, when the SART distress signal is detected, the pulse compression is performed after only the SART distress signal component is subtracted from the reception signal based on the level of the detected SART distress signal.

Alternatively, a configuration may be applied, in which, when the SART distress signal is detected, the radar image is generated only by the transmission and reception of the non-modulated pulse over the entire radar detection distance range until the SART distress signal reaches out of the range, without performing any transmission of the modulated pulse.

Incidentally, in a conventionally-known radar apparatus, whether the SART distress signal is issued is determined by cross-correlating a signal at a constant cycle which is substantially the same as that of the SART distress signal with detection data detected by the radar apparatus. However, with this method, in a case where some of a plurality of (specifically, twelve) pulses constituting the SART distress signal are masked by other echo signals, the SART distress signal may not accurately be detected. Moreover, in the conventionally-known radar apparatus, the signal processing load becomes relatively high due to requiring the correlation calculation between waveform signals having a certain length (about the reception period of the SART distress signal).

In this regard, in the radar apparatus 1 of this embodiment, whether the distress signal from the SART is issued may be determined based on a comparison result between the instantaneous frequency change rate $\Delta f(t)$ obtained from the complex reception signal which is generated from the received wave received by the radar antenna 5, and the value obtained based on the frequency sweeping speed of the SART distress signal (reference frequency sweeping speed) determined by the standard (in this embodiment, the upper limit threshold $Th_{\_HiGH}$ and the lower limit threshold $Th_{\_LOW}$). In this manner, even when some of the plurality of pulses constituting the SART distress signal are masked, degradation of the detection accuracy may be prevented. Moreover, according to the radar apparatus 1, whether the distress signal from the SART may be determined based on the comparison between the instantaneous frequency change rate obtained from the complex reception signal and the frequency sweeping speed of the SART distress signal. Thus, the signal processing load may be made smaller than the conventional case.

[Effects]

As described above, the signal processing device 15 of this embodiment may determine whether the distress signal from the SART is issued, based on the comparison result of the instantaneous frequency change rate $\Delta f(t)$ with the upper limit threshold $Th_{\_HiGH}$ and the lower limit threshold $Th_{\_LOW}$. In this manner, compared with the conventional case, even when some of the plurality of pulses constituting the SART distress signal are masked, the degradation of the detection accuracy may be prevented, and the signal processing load may be made smaller than the conventional case.

Therefore, according to the signal processing device 15, the distress signal from the SART may accurately be detected and the calculation load for the detection may be reduced.

Further, in the signal processing device 15, the instantaneous frequency change rate $\Delta f(t)$ may be calculated by obtaining the instantaneous frequency f(t) through differentiating the phase of the complex reception signal with time, and further through differentiating the instantaneous frequency f(t) with time. That is, in the radar apparatus 1, the instantaneous frequency change rate $\Delta f(t)$ may be calculated by a second-order differentiation of the phase of the complex reception signal with time. Thus, the processing load at the time of calculating the instantaneous frequency change rate $\Delta f(t)$ may be made relatively small.

Further, in the signal processing device 15, the SART distress signal may be detected using a condition that the instantaneous frequency change rate $\Delta f(t)$ is in between the upper limit threshold $Th_{\_HiGH}$ which is above the reference frequency sweeping speed, and the lower limit threshold $Th_{\_LOW}$ which is below the reference frequency sweeping speed. Thus, the SART distress signal may suitably be detected since the SART distress signal may be detected using a condition that the instantaneous frequency change rate $\Delta f(t)$ substantially matches with the frequency sweeping speed of the SART distress signal determined by the standard.

Further, in the signal processing device 15, the distress signal may be determined to be included in the complex reception signal under a condition that the instantaneous frequency change rate $\Delta f(t)$ which is between the upper limit threshold $Th_{\_HiGH}$ and the lower limit threshold $Th_{\_LOW}$ is obtained continuously for at least a given number of times. Thus, the instantaneous frequency change rate $\Delta f(t)$ which incidentally comes between the upper limit threshold $Th_{\_HiGH}$ and the lower limit threshold $Th_{\_LOW}$ may be eliminated. As a result, the SART distress signal may be detected more accurately.

Further, according to the radar apparatus 1 of this embodiment, the radar apparatus including the signal processing apparatus 15 which is capable of accurately detecting the distress signal and has a small calculation load for detecting the distress signal may be configured.

Further, according to the radar apparatus 1 of this embodiment, the radar image may be generated without performing the pulse compression for a section where the distress signal is detected out of the area detected by the radar apparatus. Therefore, the inconvenience the SART distress signal extends in the distance direction on the display unit 13 (see FIG. 10) may be solved.

[Modifications]

Although the embodiment of the present disclosure is described above, the present disclosure is not limited to this, and various modifications may be made without departing from the scope of the present disclosure.

(1) In the embodiment described above, as the information on the distress signal, the image of the SART distress signal (twelve short points) may be displayed in the radar image; however, the present disclosure is not limited to this. For example, the position of a rescue target (such as the ship in distress) estimated based on the detected SART distress signal may be displayed on the radar image with an icon etc. Further, the position (e.g., latitude and longitude) of the rescue target estimated based on the detected SART distress signal may be displayed in a portion of a display screen of the display unit other than the portion where the radar image is displayed.

(2) In the embodiment described above, the distress signal determining module 28 may detect the distress signal by using the condition that the instantaneous frequency change rate Δf(t) calculated by the instantaneous frequency change rate calculating module 21 is obtained continuously for a plurality of number of times (above the second threshold Th2); however, it is not limited to this. Specifically, for example, the distress signal may be detected using a condition that the instantaneous frequency change rate Δf(t) calculated by the instantaneous frequency change rate calculating module 21 is obtained at a given cycle (specifically, at the cycle of 7.5±1 μs, which is the cycle of the SART distress signal).

The invention claimed is:

1. A signal processing device for detecting a distress signal from a search and rescue transponder, comprising:
a memory configured to store a value obtained based on a reference frequency sweeping speed that is a frequency sweeping speed of the distress signal; and
processing circuitry configured
to calculate an instantaneous frequency by differentiating a phase of a complex reception signal with time, the complex reception signal being generated from a reception wave received by a wave receiver,
to calculate a change rate of the instantaneous frequency of the complex reception signal by differentiating the instantaneous frequency with time, and
to determine whether the distress signal is issued from the search and rescue transponder, based on a comparison result between the instantaneous frequency change rate and the value obtained based on the reference frequency sweeping speed stored in the memory.

2. The signal processing device of claim 1, wherein,
the memory is further configured to store a higher limit threshold that takes a higher value than the reference frequency sweeping speed and a lower limit threshold that takes a lower value than the reference frequency sweeping speed, and
the processing circuitry is further configured to determine that the distress signal is included in the complex reception signal under a condition that the instantaneous frequency change rate is between the upper limit threshold and the lower limit threshold.

3. The signal processing device of claim 2, wherein,
the processing circuitry is further configured
to calculate the instantaneous frequency change rate at a plurality of timings, and
to determine that the distress signal is included in the complex reception signal under a condition that the instantaneous frequency change rate that is between the upper limit threshold and the lower limit threshold is continuously obtained for at least a given number of times.

4. A radar apparatus, comprising:
a wave receiver configured to receive a reception wave;
the signal processing device of claim 3, with the processing circuitry being further configured to detect the distress signal from the search and rescue transponder and generate a radar image of inside a detection area by processing the complex reception signal generated from the reception wave that is received by the wave receiver; and
a display configured to display information regarding the distress signal detected by the signal processing device and the radar image.

5. The radar apparatus of claim 4, wherein, regarding a first area that is at least a part of the detection area, the signal processing device generates the radar image for a section of the first area where the distress signal is not detected by pulse-compressing the complex reception signal obtained from a reflection wave of a frequency modulated pulse that is a transmission wave, and the signal processing device generates the radar image for a section of the first area where the distress signal is detected by using the complex reception signal obtained from a reflection wave of a non-frequency-modulated pulse that is a transmission wave.

6. The radar apparatus of claim 4, wherein
the processing circuitry is further configured
to fetch the reception signal in the transmission-and-reception period of the non-modulated pulse and to perform reception processing on a reception echo to extract reception echo data of the second area,
to fetch the reception signal during the transmission-and-reception period of the modulated pulse, to pulse-compress a reception echo, and to extract the reception echo data of the area, and
to combine the reception echo of the non-modulated pulse with the reception echo of the modulated pulse.

7. A radar apparatus, comprising:
a wave receiver configured to receive a reception wave;
the signal processing device of claim 2, with the processing circuitry being further configured to detect the distress signal from the search and rescue transponder and generate a radar image of inside a detection area by processing the complex reception signal generated from the reception wave that is received by the wave receiver; and
a display configured to display information regarding the distress signal detected by the signal processing device and the radar image.

8. The radar apparatus of claim 7, wherein, regarding a first area that is at least a part of the detection area, the signal processing device generates the radar image for a section of the first area where the distress signal is not detected by pulse-compressing the complex reception signal obtained from a reflection wave of a frequency modulated pulse that is a transmission wave, and the signal processing device generates the radar image for a section of the first area where the distress signal is detected by using the complex reception signal obtained from a reflection wave of a non-frequency-modulated pulse that is a transmission wave.

9. The radar apparatus of claim 7, wherein
the processing circuitry is further configured
to fetch the reception signal in the transmission-and-reception period of the non-modulated pulse and to perform reception processing on a reception echo to extract reception echo data of the second area,
to fetch the reception signal during the transmission-and-reception period of the modulated pulse, to pulse-compress a reception echo, and to extract the reception echo data of the area, and
to combine the reception echo of the non-modulated pulse with the reception echo of the modulated pulse.

10. A radar apparatus, comprising:

a wave receiver configured to receive a reception wave;

the signal processing device of claim 1, with the processing circuitry being further configured to detect the distress signal from the search and rescue transponder and generate a radar image of inside a detection area by processing the complex reception signal generated from the reception wave that is received by the wave receiver; and a display configured to display information regarding the distress signal detected by the signal processing device and the radar image.

11. The radar apparatus of claim 10, wherein, regarding a first area that is at least a part of the detection area, the signal processing device generates the radar image for a section of the first area where the distress signal is not detected by pulse-compressing the complex reception signal obtained from a reflection wave of a frequency modulated pulse that is a transmission wave, and the signal processing device generates the radar image for a section of the first area where the distress signal is detected by using the complex reception signal obtained from a reflection wave of a non-frequency-modulated pulse that is a transmission wave.

12. The radar apparatus of claim 10, wherein the processing circuitry is further configured to fetch the reception signal in the transmission-and-reception period of the non-modulated pulse and to perform reception processing on a reception echo to extract reception echo data of the second area, to fetch the reception signal during the transmission-and-reception period of the modulated pulse, to pulse-compress a reception echo, and to extract the reception echo data of the area, and to combine the reception echo of the non-modulated pulse with the reception echo of the modulated pulse.

13. A method of processing a signal, the method detecting a distress signal from a search and rescue transponder, comprising:

calculating an instantaneous frequency by differentiating a phase of a complex reception signal with time, the complex reception signal being generated from a reception wave received by a wave receiver;

calculating a change rate of the instantaneous frequency of the complex reception signal by differentiating the instantaneous frequency with time;

storing a value obtained based on a reference frequency sweeping speed that is a frequency sweeping speed of the distress signal; and determining whether the distress signal is issued from the search and rescue transponder, based on a comparison result between the instantaneous frequency change rate calculated by the calculating the instantaneous frequency change rate and the value obtained based on the reference frequency sweeping speed stored in the storing the value.

14. A signal processing device for detecting a distress signal from a search and rescue transponder, comprising:

a memory configured to store a value obtained based on a reference frequency sweeping speed that is a frequency sweeping speed of the distress signal, and the memory being further configured to store a higher limit threshold that takes a higher value than the reference frequency sweeping speed and a lower limit threshold that takes a lower value than the reference frequency sweeping speed; and processing circuitry configured to calculate a change rate of an instantaneous frequency of a complex reception signal generated from a reception wave received by a wave receiver, to determine that the distress signal is included in the complex reception signal under a condition that the instantaneous frequency change rate is between the upper limit threshold and the lower limit threshold, and to determine whether the distress signal is issued from the search and rescue transponder, based on a comparison result between the instantaneous frequency change rate and the value obtained based on the reference frequency sweeping speed stored in the memory.

15. A radar apparatus, comprising:

a wave receiver configured to receive a reception wave;

a signal processing device for detecting a distress signal from a search and rescue transponder, comprising:

a memory configured to store a value obtained based on a reference frequency sweeping speed that is a frequency sweeping speed of the distress signal; and processing circuitry configured to calculate a change rate of an instantaneous frequency of a complex reception signal generated from a reception wave received by a wave receiver, to determine whether the distress signal is issued from the search and rescue transponder, based on a comparison result between the instantaneous frequency change rate and the value obtained based on the reference frequency sweeping speed stored in the memory, and to detect the distress signal from the search and rescue transponder and generate a radar image of inside a detection area by processing the complex reception signal generated from the reception wave that is received by the wave receiver; and a display configured to display information regarding the distress signal detected by the signal processing device and the radar image.

* * * * *